(12) United States Patent
El-Saban et al.

(10) Patent No.: US 11,222,044 B2
(45) Date of Patent: Jan. 11, 2022

(54) NATURAL LANGUAGE IMAGE SEARCH

(71) Applicant: Microsoft Technology Licensing, LLC, Redmond, WA (US)

(72) Inventors: Motaz Ahmad El-Saban, Cairo (EG); Ahmed Yassin Tawfik, Giza (EG); Achraf Abdel Moneim Tawfik Chalabi, Cairo (EG); Sayed Hassan Sayed, Giza (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 14/279,346

(22) Filed: May 16, 2014

(65) Prior Publication Data

US 2015/0331929 A1 Nov. 19, 2015

(51) Int. Cl.
*G06F 15/00* (2006.01)
*G06F 16/28* (2019.01)
(Continued)

(52) U.S. Cl.
CPC ........ *G06F 16/285* (2019.01); *G06F 16/3329* (2019.01); *G06F 16/50* (2019.01); *G06F 16/9024* (2019.01)

(58) Field of Classification Search
CPC .... G06F 17/24; G06F 17/25; G06F 17/30598; G06F 17/30244; G06F 17/30654;
(Continued)

(56) References Cited

U.S. PATENT DOCUMENTS 7,953,693 B2 5/2011 Smith et al.
8,285,541 B2 10/2012 Brun
(Continued)

FOREIGN PATENT DOCUMENTS

CN 101499090 A 8/2009
CN 103646032 A 3/2014
(Continued)

OTHER PUBLICATIONS

Yang, et al., "Learning the Semantics in Image Retrieval—A Natural Language Processing Approach", In Conference on Computer Vision and Pattern Recognition Workshop, Jun. 27, 2004, 7 pages.
(Continued)

*Primary Examiner* — Kavita Stanley
*Assistant Examiner* — Jenq-Kang Chu

(57) ABSTRACT

Natural language image search is described, for example, whereby natural language queries may be used to retrieve images from a store of images automatically tagged with image tags being concepts of an ontology (which may comprise a hierarchy of concepts). In various examples, a natural language query is mapped to one or more of a plurality of image tags, and the mapped query is used for retrieval. In various examples, the query is mapped by computing one or more distance measures between the query and the image tags, the distance measures being computed with respect to the ontology and/or with respect to a semantic space of words computed from a natural language corpus. In examples, the image tags may be associated with bounding boxes of objects depicted in the images, and a user may navigate the store of images by selecting a bounding box and/or an image.

20 Claims, 9 Drawing Sheets

(51) Int. Cl.
  *G06F 16/901* (2019.01)
  *G06F 16/332* (2019.01)
  *G06F 16/50* (2019.01)
(58) Field of Classification Search
  CPC ............ G06F 17/30958; G06F 16/285; G06F 16/3329; G06F 16/50; G06F 16/9024; G06T 11/60; A63F 2300/5553; A63F 2300/6623
  USPC ................................ 715/201, 202, 230, 255
  See application file for complete search history.

(56) References Cited

U.S. PATENT DOCUMENTS

| | | | |
|---|---|---|---|
| 8,612,206 | B2 | 12/2013 | Chalabi et al. |
| 9,412,366 | B2* | 8/2016 | Wilensky ............ G06F 17/2785 |
| 9,710,760 | B2* | 7/2017 | Hill ........................ G06N 20/00 |
| 10,007,679 | B2* | 6/2018 | Guo ...................... G06K 9/6269 |
| 2006/0224569 | A1 | 10/2006 | Desanto et al. |
| 2007/0005566 | A1* | 1/2007 | Bobick ............... G06F 17/2795 |
| 2007/0269775 | A1 | 11/2007 | Andreev et al. |
| 2011/0076653 | A1 | 3/2011 | Culligan et al. |
| 2012/0253785 | A1 | 10/2012 | Hamid et al. |
| 2013/0290846 | A1 | 10/2013 | Calhoun |
| 2013/0330008 | A1 | 12/2013 | Zadeh |
| 2014/0079297 | A1 | 3/2014 | Tadayon et al. |
| 2014/0081633 | A1* | 3/2014 | Badaskar ................ G10L 15/26 704/235 |
| 2014/0201126 | A1* | 7/2014 | Zadeh .................... A61B 5/165 706/52 |

FOREIGN PATENT DOCUMENTS

| | | |
|---|---|---|
| EP | 1033662 A2 | 9/2000 |
| EP | 2402867 | 1/2012 |
| EP | 2608196 A1 | 6/2013 |
| JP | 0594478 A | 4/1993 |
| JP | H07219969 A | 8/1995 |
| JP | 2009064213 A | 3/2009 |
| JP | 2010122931 A | 6/2010 |
| RU | 2345414 C1 | 1/2009 |
| RU | 2421775 C2 | 6/2011 |
| RU | 2510935 C2 | 4/2014 |
| WO | 2004072925 A2 | 8/2004 |

OTHER PUBLICATIONS

Liu, et al.,"A survey of content-based image retrieval with high-level semantics", In Journal of the Pattern Recognition, vol. 40, Issue 1, Jan. 1, 2007, 21 pages.

Zhang, et al., "Face Based Image Navigation and Search", In Proceedings of the 17th ACM International Conference on Multimedia, Oct. 23, 2009, 4 pages.

Trattner, et al., "Evaluating Tag-Based Information Access in Image Collections", In Proceedings of the 23rd ACM Conference on Hypertext and Social Media, Jun. 25, 2012, 10 pages.

Popescu, et al., "Ontology Driven Content Based Image Retrieval", In Proceedings of the 6th ACM International Conference on Image and Video Retrieval, Jul. 9, 2007, 8 pages.

Dinakaran, et al.,"Interactive Image Retrieval Using Text and Image Content", In Cybernetics and Information Technologies, vol. 10, Issue 3, Mar. 13, 2014, 11 pages.

"International Preliminary Report on Patentability Issued in PCT Application No. PCT/US2015/030687", dated May 24, 2016, 6 pages.

International Search Report and Written Opinion Issued in PCT Application No. PCT/US2015/030687, dated Aug. 14, 2015, 9 Pages.

Second Written Opinion Issued in PCT Application No. PCT/US2015/030687, dated Mar. 1, 2016, 05 Pages.

"First Office Action And Search Report Issued in Chinese Patent Application No. 201580024024.3", (w/ Concise Statement of Relevance), dated Feb. 3, 2019, 13 Pages.

"Notice of Allowance Issued in Japanese Patent Application No. 2016-567987", (w/ Concise Statement of Relevance), dated Jan. 25, 2019, 7 Pages.

"Office Action Issued in Mexican Patent Application No. MX/a/2016/014986", (w/ Concise Statement of Relevance), dated Dec. 13, 2018, 8 Pages.

"Second Office Action Issued in Chinese Patent Application No. 201580024024.3", dated Aug. 13, 2019, 13 Pages.

"Office Action Issued in Russian Patent Application No. 2016144699", dated Nov. 26, 2018, 7 Pages. (including Concise Statement of Relevance).

"Office Action Issued in Mexican Patent Application No. MX/a/2016/014986", dated May 3, 2018, 7 Pages. (including Concise Statement of Relevance).

"Office Action Issued in Australian Patent Application No. 2015259118", dated Oct. 25, 2019, 4 Pages.

Tofighi, et al., "Author's Native Language Identification from Web-Based Texts", In International Journal of Computer and Communication Engineering vol. 1 No. 1, May 2012, pp. 47-50.

"Office Action Issued in Brazilian Patent Application No. BR112016025793-6", dated Apr. 29, 2020, 5 Pages "Office Action Issued in Indian Patent Application No. 201647038826", dated Jan. 13, 2021, 7 Pages.

Byrne, Kate, "Image Retrieval Using Natural Language and Content-Based Techniques", In Proceedings of the 4th Dutch-Belgian Information Retrieval Workshop, Dec. 8, 2003, pp. 57-62.

* cited by examiner

NATURAL LANGUAGE IMAGE SEARCH

BACKGROUND

Users collect lots of images with their different devices, such as camera phones, digital cameras, video cameras and others. The images are typically stored or backed up at a personal computer, in the cloud, or at other locations.

It is time consuming and complex for users to efficiently and effectively search their collections of images. Typically users are only able to scroll through thumbnails of the images. This makes it hard for users to browse or search for images desired for a particular task.

Previous approaches have involved tagging images with metadata such as date and time stamps or keywords. Tagging is done manually or automatically. After tagging, users are able to use the tags as queries to locate images. This type of approach is restrictive as users often can't remember or do not know or understand the tags to use for retrieval.

The embodiments described below are not limited to implementations which solve any or all of the disadvantages of known image search systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Natural language image search is described, for example, whereby natural language queries may be used to retrieve images from a store of images automatically tagged with image tags being concepts of an ontology (which may comprise a hierarchy of concepts). In various examples, a natural language query is mapped to one or more of a plurality of image tags, and the mapped query is used for retrieval. In various examples, the query is mapped by computing one or more distance measures between the query and the image tags, the distance measures being computed with respect to the ontology and/or with respect to a semantic space of words computed from a natural language corpus. The semantic space of words may be computed using a neural network. In examples, the image tags may be associated with bounding boxes of objects depicted in the images, and a user may navigate the store of images by selecting a bounding box and/or an image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
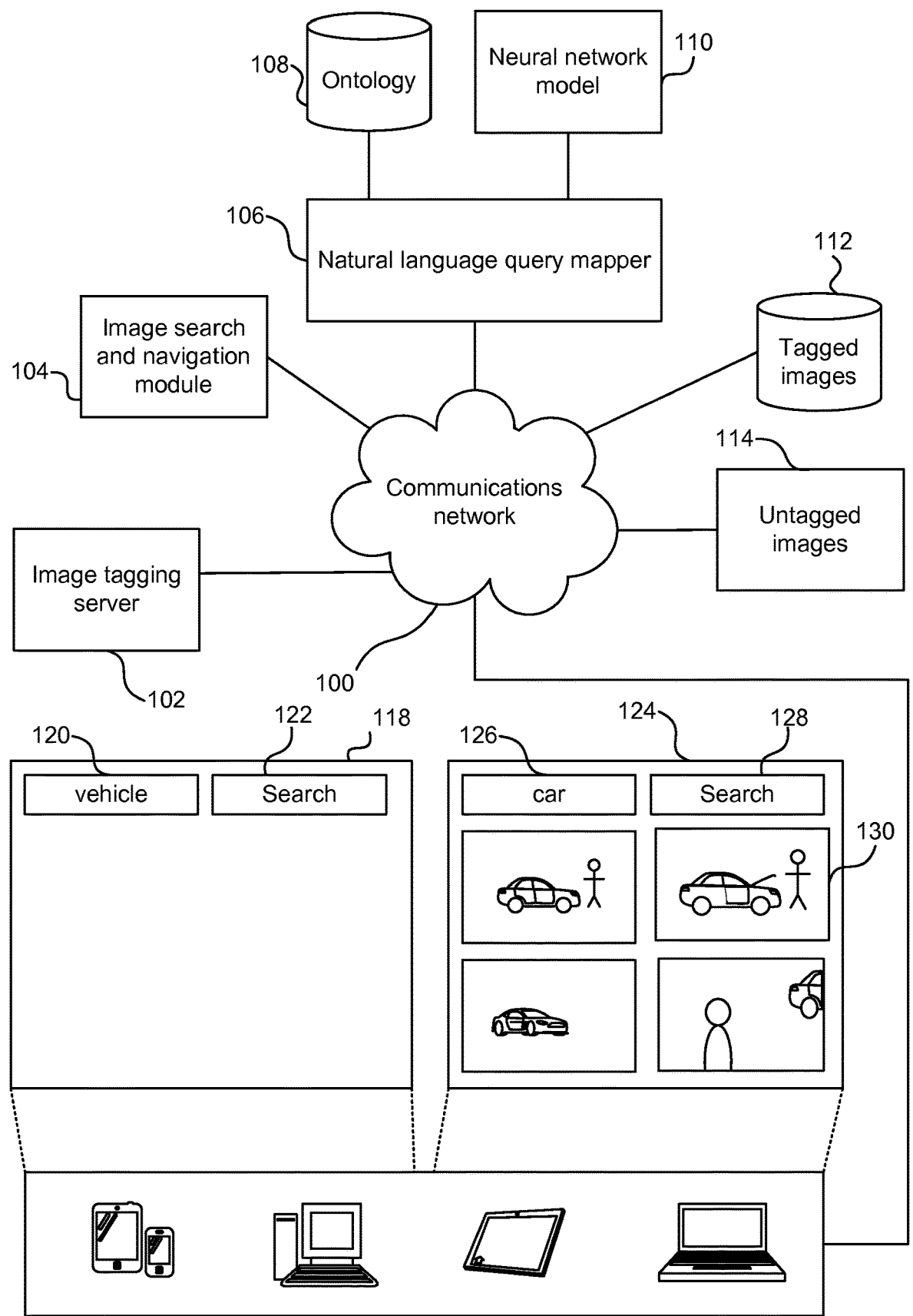
FIG. 1 is a schematic diagram of a system for searching a set of images using natural language.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples described herein use images such as digital photographs. The images may also be videos.

Described herein are systems and methods for searching a set of images using natural language queries. The images are automatically tagged with one or more image tags which describe the content of the image. The search may be executed by mapping the natural language query to one or more image tags using a combination of ontology and semantic embedding. For example, in some cases the natural language query is mapped by computing one or more distance measures between the query and the image tags, the distance measures being computed with respect to the ontology and/or with respect to a semantic space of words computed from a natural language corpus. The computed distance measures are then combined to identify one or more tags that represent the natural language query. The identified image tags are then used to identify images matching the search criteria (e.g. images tagged with the identified image tags).

Storing the set of images in association with one or more image tags describing the content and/or features of the images allows the images to be easily and efficiently retrieved without having to analyze each image at retrieval time or to manually edit or provide metadata for each image. Retrieving images from the set of images using the described methods and systems allows users to quickly and easily retrieve relevant images using natural language. This eliminates the need for users to manually scroll through a list of images to locate images with specific content which is not only time consuming but is prone to error.

Furthermore, automatically mapping the natural language query terms to one or more image tags makes searching easy and intuitive for as the user does not have to know what the specific image tags are they can simply use language that is familiar and intuitive to them. Using both ontology and semantic embedding to map the natural language query terms phrases to one or more tags unexpectedly produces a more accurate mapping than using either ontology or semantic embedding on its own.

Various examples described herein enable natural language image search (i.e. not limited to the trained concepts/ tags) and navigation between images either by full image similarity or similarity on a region level.

Although the present examples are described and illustrated herein as being implemented in a distributed image retrieval system, the system described is provided as an example and not a limitation. As those skilled in the art will appreciate, the present examples are suitable for application in a variety of different types of image retrieval systems.

Reference is first made to FIG. 1 which illustrates an example system for searching a set of images using natural language queries.

The system comprises an image tagging server 102 configured to automatically analyze a set of untagged images 114 and to generate a tagged image 112 for each of the untagged images 114. The untagged images 114 may be any collection or set of images. For example, the untagged images may be: all of the images on a specific device (e.g. smartphone), all of the images associated with a specific user on a specific device, or all of the images associates with a specific user on a plurality of devices (e.g. smartphone and laptop). The images may be located all in one place or distributed across, for example, a communication network 100.

Each untagged image is assigned one or more tags to describe the features and/or content of the image. A feature may be, for example, an object, scene, and/or landmark within the image. Each tag is a concept of an ontology 108. An ontology 108 is a graph of nodes representing concepts, the nodes being linked by edges according to relationships between the concepts. In some examples the ontology may have a hierarchical structure with a plurality of subcategories.

In particular, the image tagging server 102 is configured to analyze each untagged image 114 to identify features within the image and assign one or more image tags to each identified feature to produce a tagged image. An example image tagging server 102 will be described below with reference to FIG. 4.

The system also comprises an image search and navigation module 104 that allows the user to perform natural language searches on the tagged images 112. In particular, the image search and navigation module 104 is configured to receive natural language query terms and/or phrases from the user via an end-user device 116, and provide the natural language query terms to a natural language query mapper 106. The end-user device 116 may be, for example, a smart phone, personal computer, tablet computer, or laptop.

The natural language query mapper 106 maps each natural language query term or phrase to one or more of the tags. In various examples the natural query mapper 106 may be configured to determine whether the natural language query term or phrase matches one of the tags in the list of tags. If the term or phrase matches one of the tags in the list, the natural query mapper 106 may provide the query term or phrase back to the image search and navigation module 104 as the output of the mapping process.

If, however, the natural language query term or phrase does not match one of the tags in the list, the natural language query mapper 106 may be configured to select the tag or tags that is/are most similar to the natural language query term or phrase. In some cases, the natural language query mapper 106 is configured to select the tag or tags most similar to the query term or phrase using a combination of ontology and semantic analysis. For example, the natural language query mapper 106 may compute one or more distances between the query term or phrase and the tags, wherein each distance represents the similarity between the query term and the tag. In some examples, the natural language query mapper 106 is configured to compute a distance in an ontology between the query term or phrase and the tags; and one or more distances in a semantic space between the query term or phrase and the tags. The computed distances are then used to select the tag(s) that is/are closest or most similar to the query term or phrase.

For example, the image search and navigation module 104 may be configured to interact with a graphical user interface 118 on a display module of the end-user device 116. The graphical user interface 118 allows the user to enter one or more query terms and/or phrases (e.g. in a query term entry box 120) and initiate a search of the tagged images 114 using the entered query terms and/or phrase (e.g. by clicking or otherwise selecting a search button 122). Upon initiating the search (e.g. by clicking or otherwise selecting the search button 122) the natural language query terms and/or phrases (e.g. as entered in the query term entry box 120) are provided to the image search and navigation module 104. The image search and navigation module 104 then provides the natural language query terms and/or phrase to the natural language query mapper 106.

If the user provides a natural language query term or phrase (e.g. "vehicle") that does not match one of the tags then the natural language query mapper 106 may map the natural language query term (e.g. "vehicle") to one or more of the tags (e.g. "car") and provide the mapped tags (e.g. "car") to the image search and navigation module 104.

An example natural query mapper 106 is described with reference to FIG. 5 and an example method for mapping a natural language query term or phrase to one or more tags which may be executed by the natural language query mapper 106 is described with reference to FIG. 6.

Upon receiving one or more tags from the natural language query mapper 106 the image search and navigation module 104 uses the received tags to select images from the tagged images 122 that match the search query terms and/or phrase. In some cases the image search and navigation module 104 is configured to select the images that have been tagged or associated with the received tag(s). The image search and navigation module 104 then provides the selected images (e.g. the images matching the search query terms and/or phrases)

For example, where the user has provided the query term "vehicle" and the natural language query mapper 106 has mapped that query term to the tag "car", the image search and navigation module 104 may search the tagged images 112 for images that have been assigned the tag "car". The image search and navigation module 104 may then display the results of the search 130 (e.g. the images matching the query terms and/or phrases) to the user via, for example, the graphical user interface 124 displayed the end-user device 116. In some cases, the image search and navigation module 104 may be configured to rank the search results prior to displaying them to the user.

Figure 2:
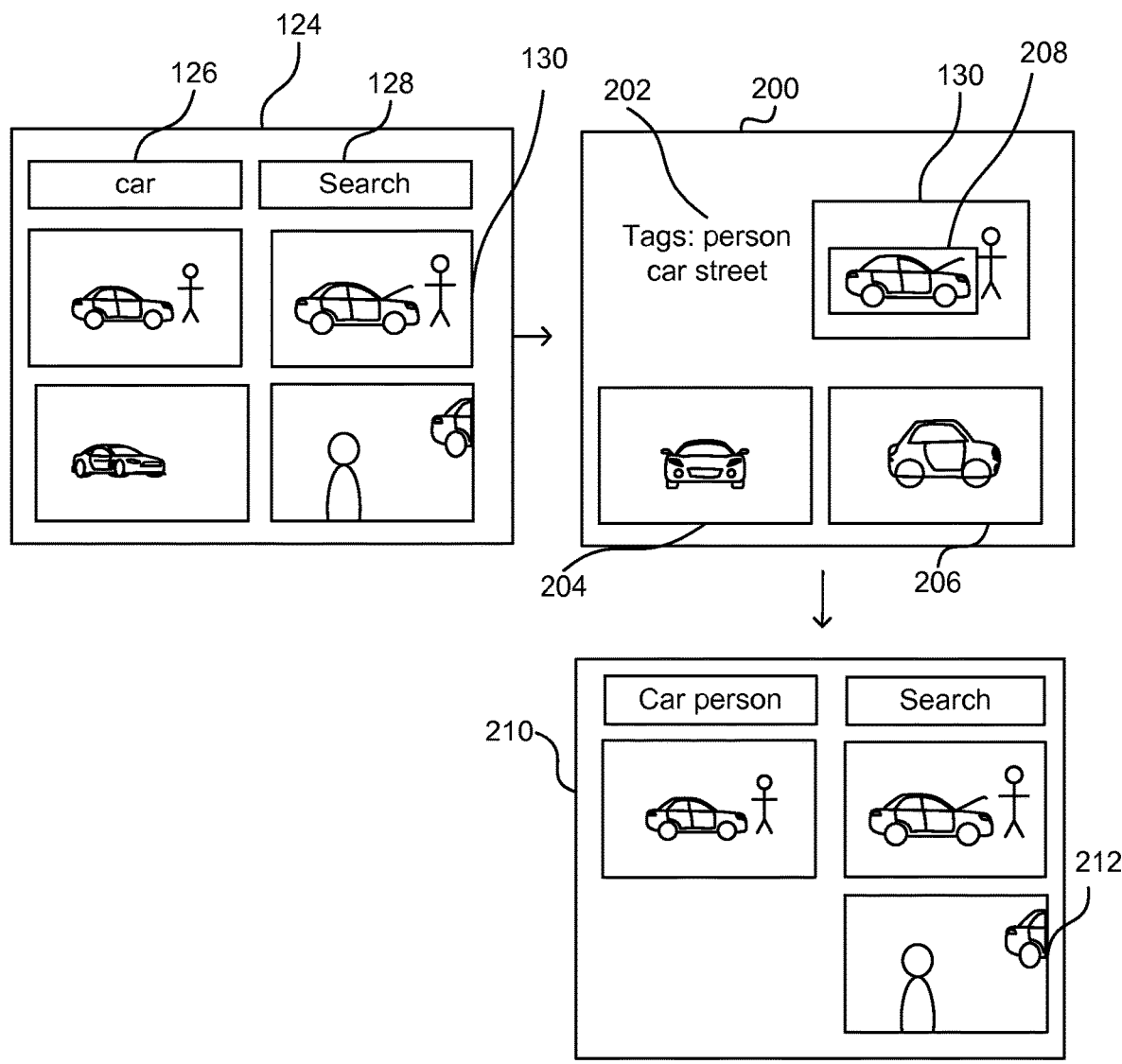
FIG. 2 is a schematic diagram of an example user-interface for searching a set of images using natural language.

Reference is now made to FIG. 2 which displays an example graphical user interface 124 for allowing a user to search a set of images using natural language queries.

As described with reference to FIG. 1 the graphical user interface 124 may comprise a query term entry box 126 which is configured to receive natural language query terms and/or phrases from a user. The query terms and/or phrases may comprise one or more keywords or key phrases (e.g. "car" and "person") and one, more or no relationship terms. A relationship term is a term such as "and", "not", "or" that specifies the relationship between the keyword. Spatial relationship terms may also be used such as "beside", "right", "left", "near". In some cases the graphical user interface may assume a default relationship term, such as and, if no relationship terms are specified.

The graphical user interface 124 also comprises a search button 128, which when activated (e.g. by clicking on the button 128 or otherwise selecting the button 128) initiates a search of the tagged images 114 using the natural language query terms and/or phrases in the query term entry box 126.

As described above, when a search is initiated the natural language query terms and/or phrases in the query term entry box 126 are sent to an image search and navigation module 104, they are then converted or mapped to one or more tags by a natural language query mapper 106, the mapped tags are then used to identify and retrieve images that match the natural language query terms and/or phrase. The identified images (or part thereof or a version thereof) are then provided to the user (e.g. via an end-user device 116).

In the example, shown in FIG. 2 the user has searched the set of images using the natural language query term "car". The images 130 (or a thumbnail or a version thereof) matching the query (e.g. images that were associated with the tag "car") are displayed to the user via the graphical user interface 124.

In some cases the user may be able to find out more information about a particular displayed image by clicking on or otherwise selecting the image. For example, as shown in FIG. 2, if the user clicks on or otherwise selected a first displayed image 130 the image may be displayed in a window 200 along with information about or related to the image 130 (e.g. tags, related images etc.). The window 200 may be part of the main graphical user interface 124 or it may be separate from the main graphical user interface.

In some examples, the window 200 may display a list of the tags 202 that have been associated with the image 130. For example, in FIG. 2, the window 200 shows that the selected image 130 is associated (or has been tagged) with the tags 202 "person", "car" and "street". In some cases the tags may be categorized and when they are displayed to the user (e.g. in the window 200) they are displayed in association with their category. For example, tags related to objects identified in the image may be identified as being "object" tags; tags related to a particular scene identified in the image may be identified as "scene" tags; and tags related to a particular landmark identified in the image may be identified as "landmark" tags. Tags related to a particular region (or bounding box) in the image may be identified as "region" tags. In some cases the user may automatically update the query terms by clicking on or otherwise selecting one of the tags. For example, if the user clicked on or otherwise selected the tag "person", the term "person" may be added to the query term entry box.

In some examples, the window 200 may also, or alternatively, display one or more images 204 and 206 that are similar to the selected image 130. The similarity of two images may be determined, for example, based on the number of image tags that they share (i.e. have in common). For example, in some cases the more image tags two images have in common, the more similar they are. The similarity of two images may also be based on the confidence value assigned to the image tags. For example, in addition to tagging untagged images 114 with one or more image tags, the image tagging server 102 may be configured to assign a confidence value to each tag that is assigned to an image. The confidence value indicates the accuracy of the image tag with respect to the image (e.g. it indicates that the likelihood that the image comprises the feature (e.g. object, scene etc.) indicated by the image tag). The user may learn more about a particular similar image by clicking on or otherwise selecting the similar image. In another example the similarity of two images may be determined based on visual features extracted from the images. The features may be extracted using a deep neural network or in other ways.

In some examples, the user may be able to see what objects were identified in the selected image 130 by moving the cursor, for example, over the display of the selected image 130 in the window 200. When the cursor is situated over an identified object, the identified object may be indicated or highlighted as such. For example, as shown in FIG. 2, a rectangular box 208 (also referred to as a bounding box) may be shown around the identified object. The bounding box around the object can just pop up over the image, without actually being drawn. Box 208 when clicked can be used to navigate between images by searching for images with related region tags. For example, if the bounding box 208 contains a person then the region tag may be "person". When user input is received selecting the bounding box 208 the region tag may be used as a query to retrieve images.

The user may automatically add terms to the query by clicking on or otherwise selecting an object in the selected image 130. For example, if the user moves the cursor over one of the people shown in the selected image 130, a rectangular box will be displayed over the person. If the user then clicks anywhere in the rectangular box the term "person" may be added to the query term entry box so that it comprises two query terms—"car" and "person". When a query is subsequently initiated, the query may be performed to locate images that match either or both query terms, depending on the configuration of the system. For example, where the query is automatically updated or modified to include the terms "car" and "person" the graphical user interface 210 may be updated to display images 212 that match both query terms (e.g. "car" and "person").

Allowing users to automatically update the query terms in this manner provides the user with a quick and efficient way to edit a query and navigate through a set of images.

The results of the image search may be presented as a plurality of thumbnail images arranged in a grid or other pattern. In some examples a top ranked image (returned from the search) is presented in a center of a graphical user interface results region, and lower ranked images are presented around the central image with arcs connecting the central image to each of the lower ranked images. The arcs may have a width, color or other feature which represents a strength of similarity between the central image and the lower ranked images.

Figure 3:
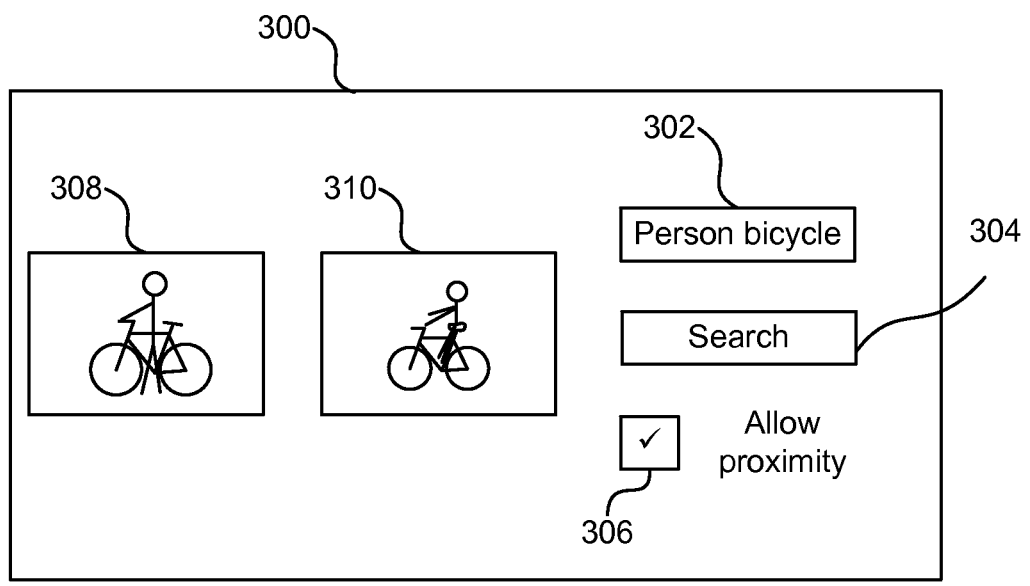
FIG. 3 is a schematic diagram of another example user-interface for searching a set of images using natural language.

Reference is now made to FIG. 3 which illustrates another example graphical user interface 300 for allowing a user to search a set of images using natural language. In this example, the graphical user interface 300, like the graphical user interface 124 of FIGS. 1 and 2, comprises a query term entry box 302 and a search button 304 which may operate in the same manner as the query term entry box 126 and search button 128 of FIGS. 1 and 2.

The graphical user interface 300 of FIG. 3 also comprises a proximity selection tool 306. The proximity selection tool 306 allows the user to search for images which have the specified query terms proximate to each other within the image. Such a search is referred to herein as a proximity search or query. For example, as shown in FIG. 3, if the query terms include "person" and "bicycle" a search or query initiated (e.g. by clicking on or otherwise selecting the search button 304) using these terms will identify images that comprise a person proximate (or in close proximity) to a bicycle.

In some cases the image tagging server 102 may be configured to record the location of any objects identified in the image in association with the tagged image. This information may subsequently be used to dynamically determine the distance between objects in images when a proximity search is initiated. For example, when the image search and navigation module 104 receives a proximity search from the user (via, for example, an end-user device 116) the image search and navigation module 104 may be configured to locate or identify images in the set of tagged images that match the query terms; determine the distance between specified objects in the identified images using the location information; and eliminate any identified images where the calculated distance exceeds a predetermined threshold.

Alternatively, the image tagging server 102 may be configured to automatically determine the distance between any objects in an image and store this distance information in association with the tagged image. This may allow for quicker retrieval of images matching a proximity query as the image and navigation module 104 does not have to first compute distances before it can return a list of matching images, however, it requires more space to store the additional distance information.

Figure 4:
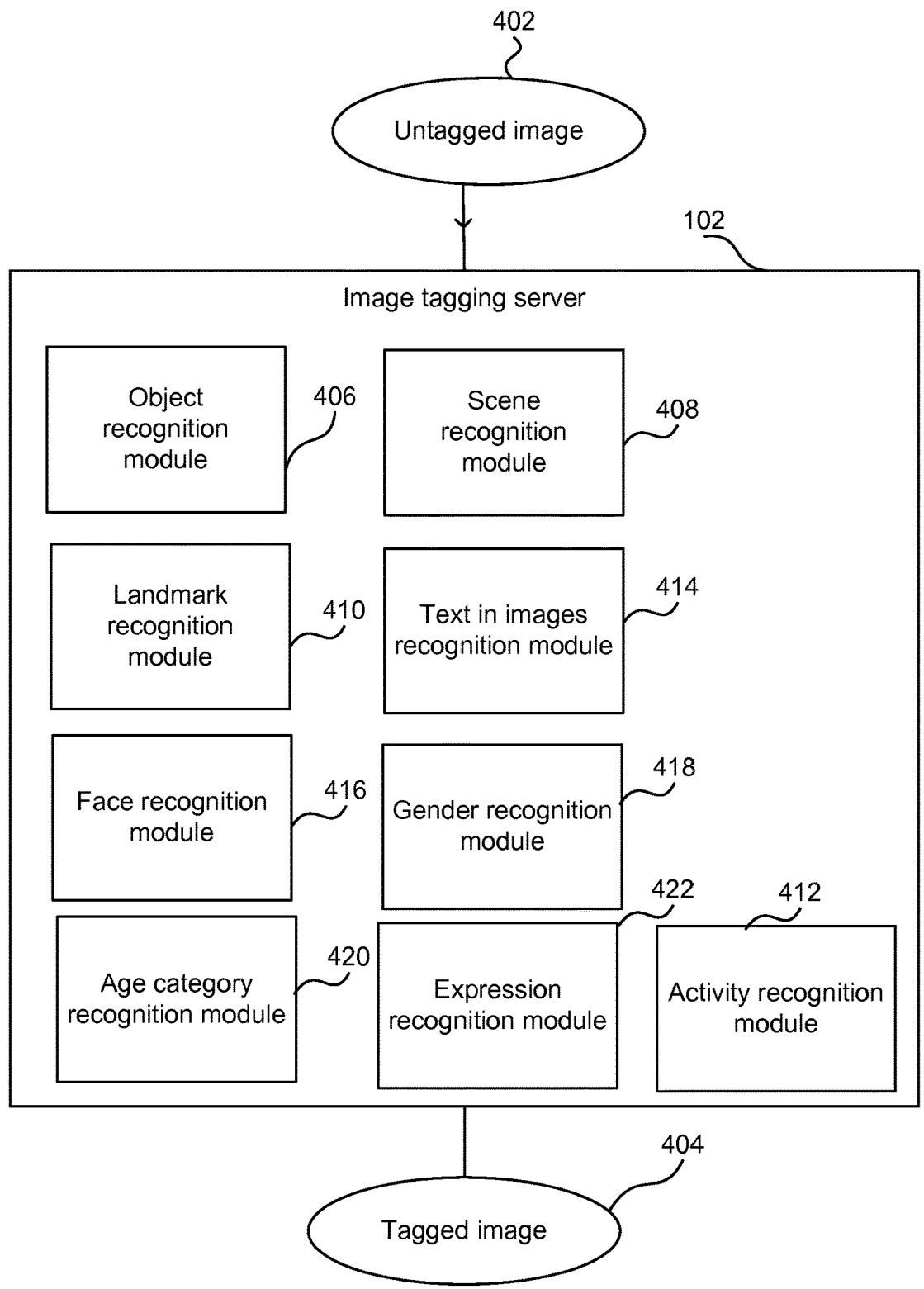
FIG. 4 is a block diagram of the image tagging server of FIG. 1.

Reference is now made to FIG. 4 which illustrates an example image tagging server 102. As described above the image tagging server 102 receives an untagged image 402 and generates a tagged image 404. A tagged image 404 is one that has one or more tags associated with it where a tag describes a feature of the image. In some cases the image tagging server 102 may receive only an untagged image. In other cases the image tagging server 102 may also receive metadata associated with the image. Where the image tagging server receives metadata in addition to the untagged image the 102 the image tagging server 102 may use the metadata to aid in tagging the image. For example, a global positioning system (GPS) can be used to retrieve nearby landmarks from a database of landmarks. The nearby landmark names may be used as tags. In another example, the use of flash while photographing can boost the chance of a "night" tag or can be used to select between competing models of outdoor at day time versus outdoor at night time.

The image tagging server 102 comprises one or more recognition modules. For example, a landmark recognition module using GPS data and a database of landmarks. Some of the recognition modules are pre-trained to identify certain features within an image and associate one or more tags with each identified feature. For example, the image tagging server 102 of FIG. 4 comprises an objection recognition module 406, a scene recognition module 408, a landmark recognition module 410, an activity recognition module 412, a text in images recognition module 414, a face recognition module 416, a gender recognition module 418, an age recognition module 420, an expression recognition module 422. The activity recognition module 412 may use rules or a trained machine learning system to detect activities depicted in images. The text in images recognition module may comprise an OCR component. The age and gender recognition modules operate where appropriate consent has been obtained from any people depicted in the images. These use machine learning and/or rules to classify people depicted in images into gender and age classes. The expression recognition module may comprise gesture recognition, and facial expression recognition components which may be machine learning components.

In other examples, the image tagging server 402 may comprise only one of these recognition modules, another combination of these recognition modules, or other suitable recognition modules.

The objection recognition module 406 is configured to identify objects in the images, classify the identified objects and assign the objects one or more tags based on the classification. The objection recognition module 404 may be configured to classify elements of the image into one of a fixed number of object classes using a discriminative technique. For example, a trained random decision forest may be used to classify the pixels of the image using pixel difference features. In some cases, each node of the trees of the random decision forest is associated with either appearance or shape. One or more tags are then assigned to the image, or to an element of the image such as a bounding box, pixel or group of pixels, based on the classification.

The scene recognition module 408 is configured to classify the scene of the image and assign one or more tags based on the classification. The scene classifier may be trained from labeled data (images with known scenes) in order to build a machine learning model for a given scene comprising extracting visual features from images and then training a classifier (such as a random forest or neural network). Feature extraction may be done using a deep neural network that is arranged to perform both feature extraction and classification on raw pixel values.

The landmark recognition module 410 is configured to identify known landmarks (e.g. the leaning tower of Pisa) in an image and assign one or more tags based on the identification. In some cases the landmark recognition module 410 may work in conjunction with the object recognition module 406. For example, the landmark recognition module 410 may receive information from the object recognition module 408 on objects identified in the image. The landmark recognition module 410 may then use the shape of the object and location information in the metadata to identify an object as a landmark. The location information may be generated automatically by the device (e.g. camera) that generated the image or may be manually entered into the metadata. Once the landmark recognition module 410 has identified an object as a landmark then one or more tags is assigned to or associated with the image. In another example, GPS metadata associated with the images is used to look up potential landmarks in a database of landmarks. If there is more than one close landmark, then the visual content of the image may be used to select one of the potential landmarks using canonical images of the landmarks stored in the database.

Figure 5:
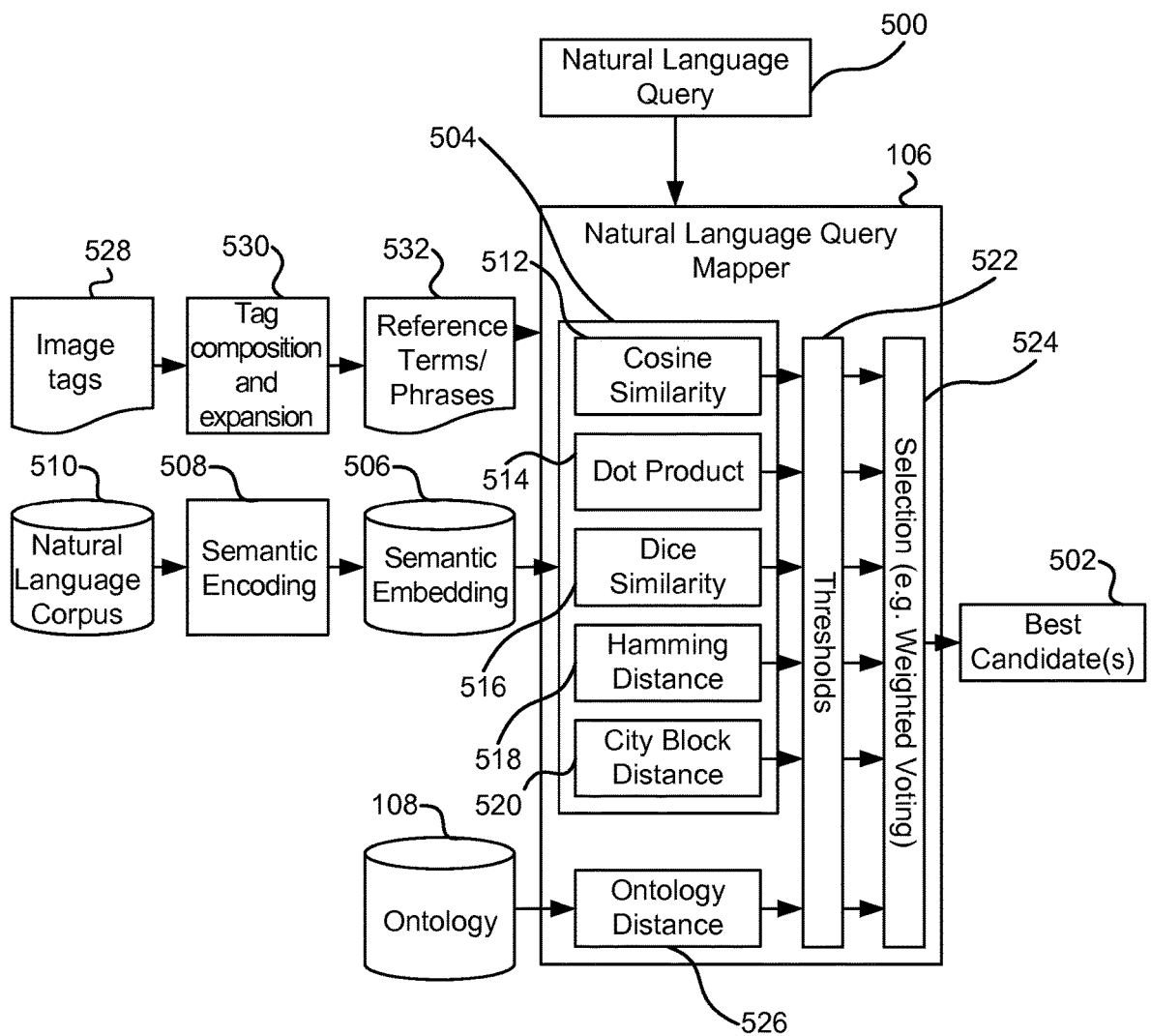
FIG. 5 is a block diagram of the natural language query mapper of FIG. 1.

Reference is now made to FIG. 5 which illustrates an example natural language query mapper 106. As described above, the natural language query mapper 106 receives a natural language query terms and/or phrases 500 from the image search and navigation module 104 and maps each nature language query term and phrase to one or more image tags 502 of a plurality of image tags 503 (referred to herein as the mapped tags). In particular the natural language query mapper 106 uses a combination of semantic analysis and ontology (where each tag is a concept in the ontology) to map each natural language query term and/or phrase 500 to one or more image tags 502. The mapped image tags 502 are then provided to the image search and navigation module 104 to identify images that have been tagged with mapped image tags 502.

The natural language query mapper 106 of FIG. 5 comprises a semantic distance module 504 configured to compute at least one distance in a semantic space between a natural language query term or phrase and each of the possible image tags. Each distance indicates the semantic similarity between the natural language query term or phrase and the corresponding image tag. The semantic similarity of two words or phrases is based on whether they have similar meaning (e.g. they are used to mean similar things in the same context).

In some cases the semantic distance(s) are calculated by the semantic distance module 504 from a semantic embedding 506 of words and/or phrases which is a semantic space of words where each word or phrase is mapped to a low or high dimensional embedding vector that represents the semantic similarity between words and/or phrases.

In some cases the semantic embedding 506 is generated by applying semantic encoding 508 to a natural language corpus 510. The natural language corpus 510 is a large set of texts. The semantic encoding 508 is a machine learning component that is trained to capture semantic information between words.

In some cases the semantic encoding is a neural network, such as a recursive neural network (RNN), which is trained to predict a word given the surrounding words (or context). Consequently, words that appear in similar context end up with similar embedding vectors. Applying such as neural network to the natural language corpus 510 results in a high dimensional embedding of each word based on the similarity of the use of the words in the sentences encountered in the natural language corpus. For example, the words "warm" and "hot" may occur in sentences similar to the following:

The soup was still hot . . .
The soup was still warm . . .
The hot weather . . .
The warm weather . . .

This would result in the words "hot" and "warm" having similar or identical embedding vectors.

The semantic distance module 504 may be configured to calculate one or more distances in the semantic space of words (i.e. semantic embedding 506). In particular, the semantic distance module 504 may comprise one or more distance modules wherein each distance module calculates the distance in a different manner. For example, the semantic distance module 504 of FIG. 5 comprises a cosine similarity module 512 that calculates the cosine similarity between the natural language query term and/or phrase and individual tags; a dot product module 514 that calculates the dot product of the natural language query term and/or phrase and individual tags; a dice similarity module 516 that calculates the dice similarity of the natural language query term and/or phrase and individual tags; a hamming distance module 518 that calculates the hamming distance between the natural language query term and/or phrase and individual tags; and a city block distance module 520 that calculates the city block distance between the natural language query tem and/or phrase and individual tags. However, in other examples, the semantic distance module 504 may comprise only one of these distance modules, a different combination of these distance modules or different types of distance modules.

Each distance module 512-520 calculates the distance in a different manner thus each determines the similarity between words and/or phrase in a different manner. To get the best result the distances calculated by the various distance modules 512-520 are combined to look for agreements in results. In particular, the distances may be provided to a threshold module 522 which may discard any distance that is above a predetermined threshold (indicating that the natural language query term and the tag are not very similar). The threshold may be different for different types of distances. Any distance that falls below the corresponding predetermined threshold is provided to a selection module 524 where the distances that exceeded the threshold provide a vote for the corresponding tag. The votes are then combined to select the tags or tags with the highest number of votes. In some cases the votes are weighted based on the strength of the similarity (e.g. the distance value). Combining the distances in this manner increases the accuracy of the mapping since each distance uses different criteria. Generally the more different distance calculations that are used the more accurate the mapping. However, the trade-off is increased processing time and resources.

While calculating and combining different semantic distance values can produce quite accurate mapping results, occasionally, a word and its opposite (or an unrelated word) are commonly used in identical context. For example opposite and unrelated words "fast", "slow" and "barely" may be used in similar context such as "the slow moving train" and "the fast moving train"; and "the barely moving train". Accordingly, additional information (i.e. information other than semantic analysis information) may be useful to discriminate in these situations and thus increase the accuracy of the mapping.

In some examples, the additional information is obtained from an ontology. In particular, the example natural language query mapper 106 of FIG. 5 comprises an ontology distance module 526 which is configured to compute a distance in an ontology between the natural language query term or phrase 500 and each of the image tags. As described above the ontology 108 is a graph of nodes representing concepts (each tag being a concept in the ontology) where the nodes are linked by edges according to relationships between the concepts. Each ontology distance is computed by traversing between nodes in the ontology.

The ontology may be a commercially available ontology, such as WordNet® or an ontology that has been specially developed. WordNet® is a large lexical database of English words which are grouped into sets of cognitive synonyms (synsets), each expressing a distinct concept. The synsets are interlinked by means of conceptual-semantic and lexical relations.

The ontology distances generated by the ontology distance module 526 are also provided to the threshold module 522 where any distances above a certain threshold are discarded or ignored and any distances that fall below the predetermined threshold are provided to the selection module 524 where they provide a vote for the corresponding tag.

Figure 6:
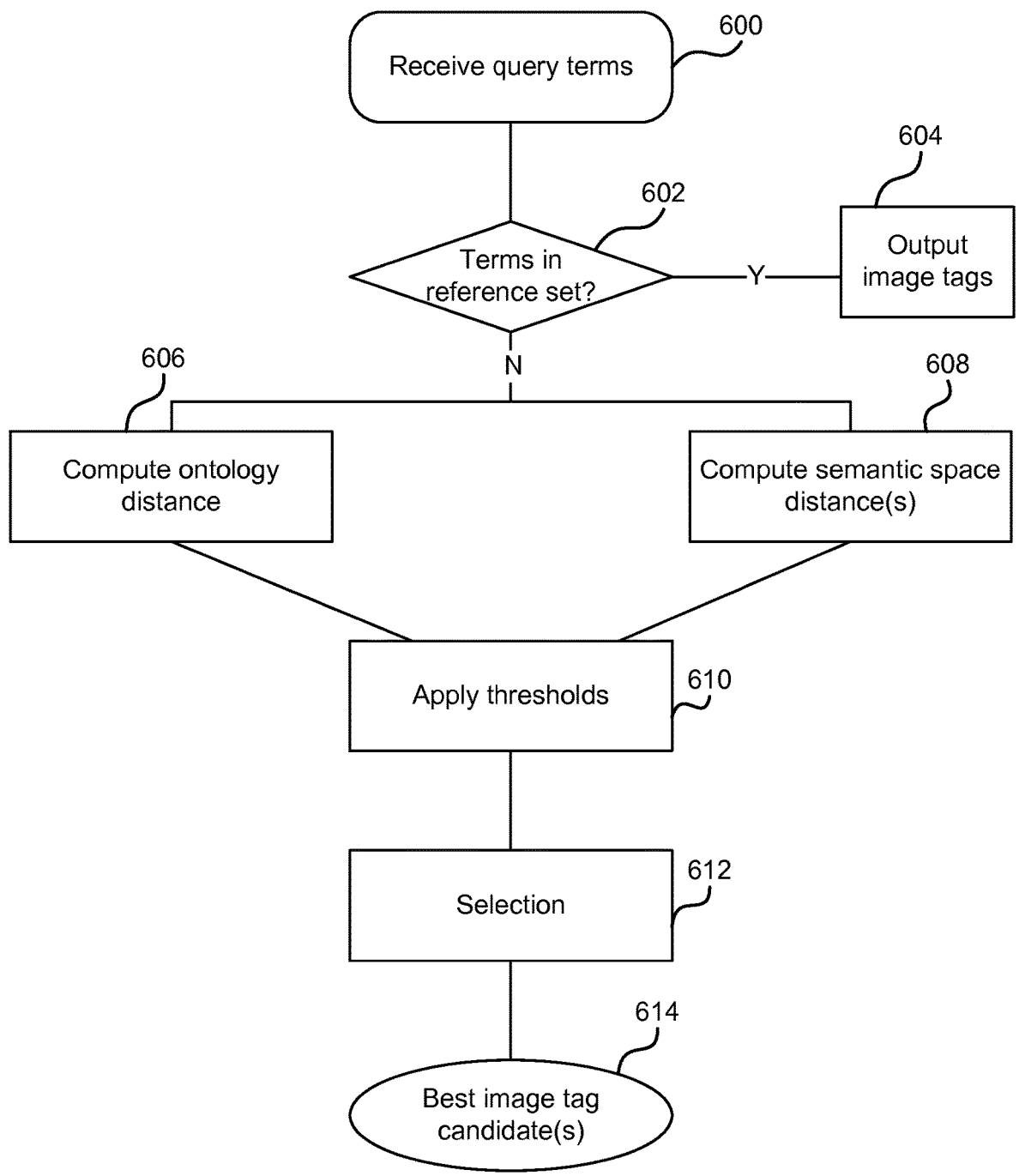
FIG. 6 is a flow diagram of a method of mapping a natural language query term to one or more tags.

Reference is now made to FIG. 6 which illustrates a method for mapping a natural language query term or phase to one or more image tags using a combination of ontology and semantic analysis which may be executed by the natural language query mapper 106. At block 600, the natural language query mapper receives a natural language query term or phrase. As described above, the natural language query term or phrase may be received from the image search and navigation module 104 after the image search and navigation module 104 receives a search request (specifying one or more query terms and/or phrases) from a user via an end-user device 116.

Upon receiving the natural language query term and/or phrase the natural language query mapper 106 determines 602 whether the term and/or phase is in the reference set (e.g. is one of the image tags). If the natural query term and/or phrase is in the reference set then the natural language query mapper 106 provides the image tag to the image search and navigation module 104 which it then uses to identify and retrieve images matching the natural language query 604.

If the natural query term and/or phrase is not in the reference set (e.g. it does not match an image tag) then the method proceeds to blocks 606 and 608 where an ontology distance and one or more semantic space distances are computed between the natural language query term or phrase and individual image tags. As described above with reference to FIG. 5 computing an ontology distance may comprising computing a distance in the ontology (e.g. WordNet®) between the natural language query term or phrase and individual image tags where each image tag is a concept in the ontology.

As described above with reference to FIG. 5 computing one or more semantic distances may comprise computing a distance in a semantic space of words between the natural language query term or phrase and individual image tags. The semantic space of words may be have been generated by applying a trained machine learning component, such as a neural network, to a corpus of natural language text. The semantic distances may include one or more of cosine similarity, dot product, dice similarity, hamming distance, and city block distance.

Once the ontology and semantic distances are generated or computed the method proceeds to block 610 where one or more threshold are applied to the ontology and semantic distances to eliminate or discard distances which are above a predetermined threshold. There may be specific predetermined thresholds to each type of distance (e.g. one for ontology distances and one for each type of semantic distance) or there may be on predetermined threshold that is applied to all distances. The objective of applying the threshold(s) is to eliminate distances that indicate such a remote similarity between the query term or phrase that they do not need to be considered in selecting an appropriate image tag. By eliminate these distances at this stage, the processing power required to select the best image tag candidates can be reduced.

Once the threshold(s) has/have been applied to the computed distances, the method proceed to 612 where the remaining distances are used to select one or more image tags that are closest to the natural language query term or phrase. In some cases each remaining distance is considered a vote for the corresponding image tag. The votes for each image tag are then accumulated to get a vote count or value for each image tag. The image tags with the most votes may be selected at the best image tag candidates 614 and forwarded to the image search and navigation module 104.

In some cases, prior to accumulating the votes each vote is weighted. The weights may be based on the magnitude of the associated distance value. For example, in some cases a smaller distance value will be given a higher weight.

Figure 7:
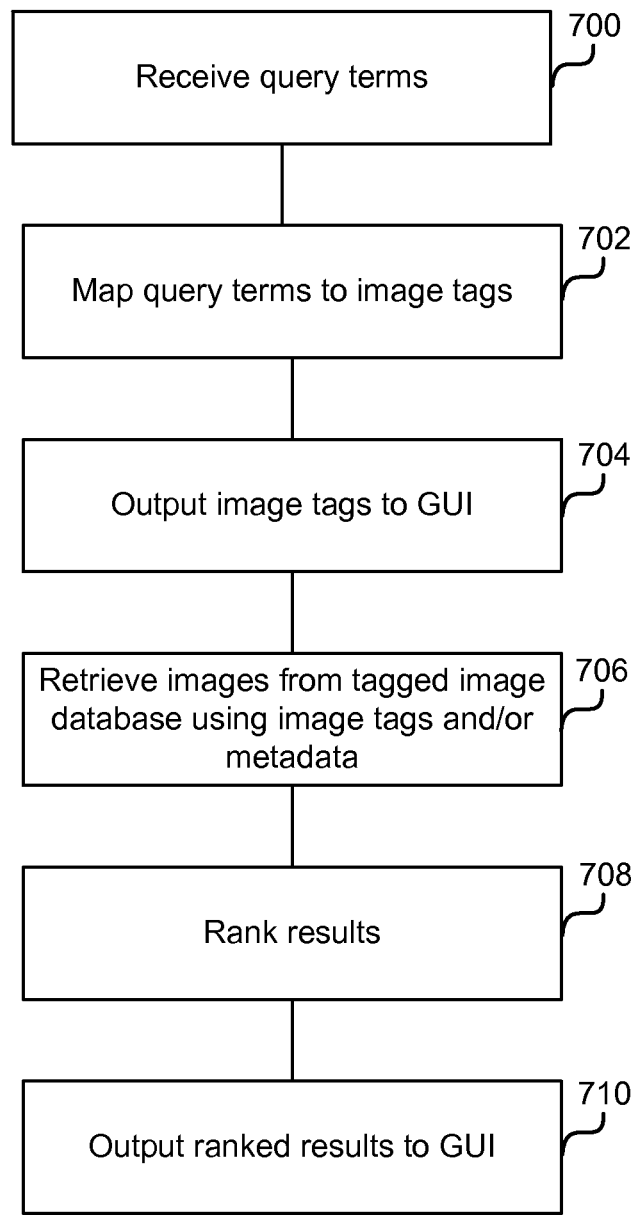
FIG. 7 is a flow diagram of a method of searching a set of images using natural language.

Reference is now made to FIG. 7 which illustrates a method for searching a set of images using natural language query terms and/or phrases which may be executed by the search and navigation module 104. At block 700 the search and navigation module 104 receives a search query (including natural language query terms and/or phrases and optionally a proximity indicator) from a user via an end-user device 116. Upon receiving the natural language query terms and/or phrases the search and navigation module 104 provides the natural language query terms and/or phrases to the natural language query mapper 106 to map the natural language query terms and/or phrases to one or more image tags 702. The natural language query mapper 106 may map the natural language query terms and/or phrases to one or more image tags using, for example, the method of FIG. 6. The natural language query mapper 106 then provides the mapped image tags to the image search and navigation module 104.

In some examples, upon receiving the mapped image tags, the method proceed to block 204 where the image search and navigation module 104 outputs the image tags to a graphical user interface displayed on the end-user device 116. However, it is not essential to output the image tags to the GUI. The method then proceed to block 206.

At block 206, the image search and navigation module 104 uses the mapped image tags to identify and retrieve one or more imaged from the tagged images database that match the natural language query terms and/or phrases. For example, the image search and navigation module 104 may retrieve images that have been tagged with the mapped image tags. Where the search request comprised a proximity indicator may only retrieve images that have been tagged with the mapped image tags and have the objects identified by the mapped image tags in close proximity. Once the matching images have been retrieved from the tagged image database the method may proceed to block 208 or the method may proceed directly to block 210.

At block 208, the image search and navigation module 104 ranks the retrieved images based on how well they match the search criteria. For example, as described above, in some cases the image tagging server 102 may be configured to assign a confidence value to each image tag assigned to an image. The confidence value indicates the accuracy of the tag (e.g. the likelihood that the image contains the item identified by the tag). In these cases the image search and navigation module 104 may be configured to rank the retrieved images. For example, the higher the confidence value for the mapped image tags (which intersect with the mapped query terms) the higher the image is ranked. In other cases, other criteria may be used to rank the retrieved images. For example, a machine learning ranker may be trained to rank order search results based on query-image pairs that have been manually judged by a human annotator.

At block 210 the image search and navigation module 104 may output the ranked or not ranked retrieved images to a graphical user interface of the end-user device 116.

Figure 8:
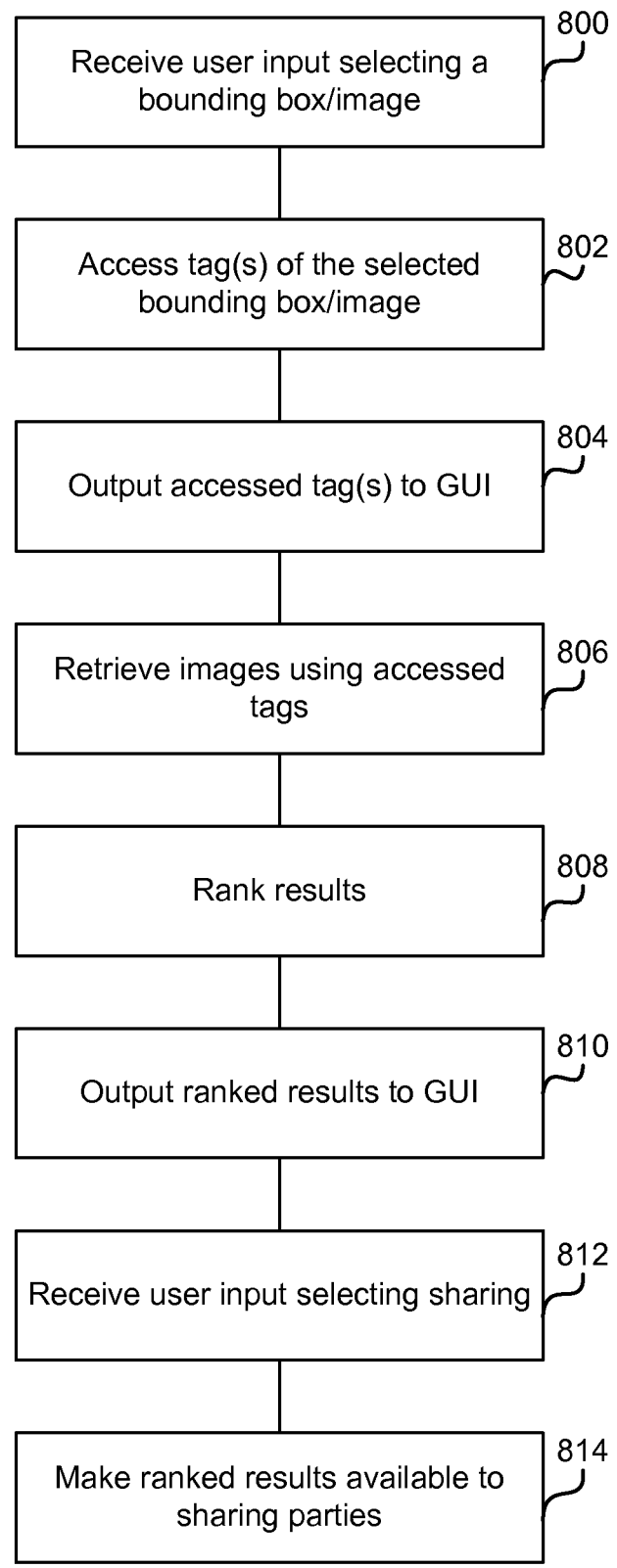
FIG. 8 is a flow diagram of a method of navigating a set of images.

Reference is now made to FIG. 8 which illustrates a method for navigating through a set of images which may be executed by the image search and navigation module 104. At block 800, the image search and navigation module 104 receives an indication from an end-user device 116 that the user has selected one of a displayed image or an object within a displayed image (indicated by, for example, a bounding box).

The image search and navigation module 104 retrieves the tags associated with the selected image or the selected object 802 and displays the image tags for the selected image or object in a graphical user interface 804. Where the user has selected an image the image tags for the image may be displayed as list in the graphical user interface as shown in FIG. 2. Where, however, the user has selected an object within an image the image tag associated with the object may be displayed on top of the bounding box, for example, or within the query term entry box as shown in FIG. 2.

The image search and navigation module 104 also retrieves images using the image tags for the selected image or the selected object. Where the user has selected an image, the retrieved images may be images that are similar to the selected image. Similarity may be based on the image tags that are shared in common. The more image tags that are shared the more similar two images are. Accordingly, where the user has selected an image the image search and navigation module 104 may be configured to retrieve images from the tagged image database that have been tagged with the same image tags as the selected image. Where, however, the user has selected an image, the retrieved images may be images that comprise the query terms in the query term entry box (which now includes the image tag associated with the selected object. Once the images have been retrieved from the tagged image database the method may proceed to block 808 or it may proceed directly to block 810.

At block 808 the retrieved images are ranked based on how the accuracy of the image tags used for retrieval. For example, as described above, in some cases the image tagging server 102 may be configured to assign a confidence value to each image tag assigned to an image. The confidence value indicates the accuracy of the tag (e.g. the likelihood that the image contains the item identified by the tag). In these cases the image search and navigation module 104 may be configured to rank the retrieved images using the confidence values. For example, the higher the confidence value for the mapped image tags the higher the image is ranked. In other cases, other criteria may be used to rank the retrieved images. Once the retrieved images have been ranked the method proceed to block 810.

At block 810 the image search and navigation module 104 outputs the ranked or not-ranked list of retrieved images to a graphical user interface displayed on the end-user device 116. Where the user selected an image the retrieved images (the images similar to the selected images) may be displayed in a secondary window of the GUI as shown in FIG. 2. Where, however, the user selected an object the retrieved images (the images matching the query terms) may be displayed in a main results window of the GUI as shown in FIG. 2.

At block 812 the image search and navigation module may receive an indication from the end-user device 116 that the user has indicated that wish to share the displayed images with another party. When the image search and navigation module 104 receives such an indicate the image search and navigation module 104 may proceed to block 814 where the retrieved images are made available to the specified parties, by for example, a social networking tool accessible to the user and/or end-user device 116.

Figure 9:
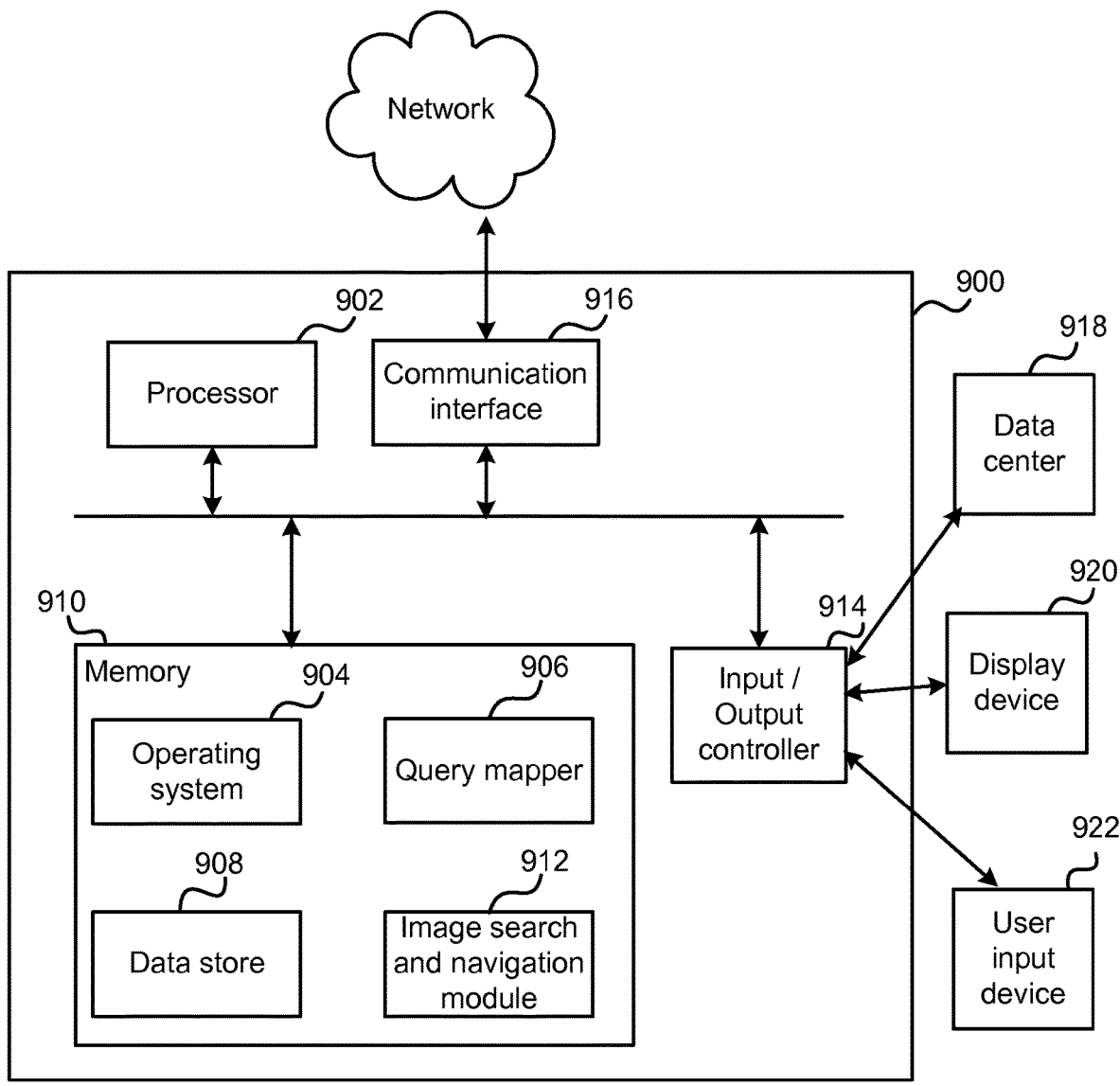
FIG. 9 illustrates an exemplary computing-based device in which embodiments of the systems and methods described herein may be implemented.

FIG. 9 illustrates various components of an exemplary computing-based device 900 which may be implemented as any form of a computing and/or electronic device, and in which embodiments of the systems and methods described herein may be implemented.

Computing-based device 900 comprises one or more processors 902 which may be microprocessors, controllers or any other suitable type of processors for processing computer executable instructions to control the operation of the device in order to search a set of images using natural language. In some examples, for example where a system on a chip architecture is used, the processors 902 may include one or more fixed function blocks (also referred to as accelerators) which implement a part of the method of searching a set of images using natural language in hardware (rather than software or firmware). Platform software comprising an operating system 904 or any other suitable platform software may be provided at the computing-based device 900 to enable application software such as a query mapper 906 and an image search and navigation module 912 to be executed on the device.

The computer executable instructions may be provided using any computer-readable media that is accessible by computing based device 900. Computer-readable media may include, for example, computer storage media such as memory 910 and communications media. Computer storage media, such as memory 910, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 910) is shown within the computing-based device 900 it will be appreciated that the storage may be distributed or located remotely and accessed via a network or other communication link (e.g. using communication interface 916).

The computing-based device 900 also comprises an input/output controller 914 arranged to output display information to a display device 920 which may be separate from or integral to the computing-based device 900. The display information may provide a graphical user interface. The input/output controller 914 is also arranged to receive and process input from one or more devices, such as a user input device 922 (e.g. a mouse, keyboard, camera, microphone or other sensor). In some examples the user input device 922 may detect voice input, user gestures or other user actions and may provide a natural user interface (NUI). This user input may be used to control operation of the computing-based device 900. In an embodiment the display device 920 may also act as the user input device 922 if it is a touch sensitive display device. The input/output controller 914 may also output data to devices other than the display device, e.g. a locally connected printing device (not shown in FIG. 9).

Any of the input/output controller 914, display device 920 and the user input device 922 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
   receiving a natural language query comprising one or more terms for searching an image in a data structure, wherein the image is tagged with one or more image tags describing one or more objects depicted in the image;
   computing a ontology distance in an image content ontology between the one or more terms and the one or more image tags, wherein each of the one or more image tags is a concept of the image content ontology and the ontology distance is computed by traversing between concepts in the image content ontology;
   computing, using a first semantic distance method, a first semantic distance in a semantic space of words between the one or more terms and the one or more image tags, wherein the first semantic distance indicates a first semantic similarity between the one or more terms and the one or more image tags, and wherein the semantic space of words is generated by a machine-learning program;
   computing, using a second semantic distance method, a second semantic distance in the semantic space of words between the one or more terms and the one or more image tags, wherein the second semantic distance indicates a second semantic similarity between the one or more terms and the one or more image tags, and wherein the first semantic distance method is different from the second semantic distance method;
   comparing the ontology distance, the first semantic distance, and the second semantic distance to one or more threshold values;

when one or more distances of the ontology distance, the first semantic distance, and the second semantic distance do not exceed the one or more threshold values, selecting an image tag from the one or more image tags based on the one or more distances;

using the selected image tag to retrieve the image from the data structure; and causing presentation on a user interface of the image.

2. The method of claim 1, wherein the concepts in the image content ontology are linked by edges according to relationships between the concepts.

3. The method of claim 1, wherein the machine-learning program is a neural network.

4. The method of claim 1, wherein the second distance is computed using any of cosine similarity, dot product, dice similarity, hamming distance, and city block distance.

5. The method of claim 1, further comprising:
computing a third distance in the semantic space of words between the natural language query and the plurality of image tags, the third distance being computed with a different operation than the second distance, wherein selecting the at least one image is further based on the third distance.

6. The method of claim 1, wherein selecting at least one of the plurality of image tags further comprises:
selecting image tags that are within a predetermined first distance threshold and within a predetermined second distance threshold.

7. The method of claim 1, wherein selecting the image tag comprises:
representing the first distance and the second distance as a vote for one or more image tags;
combining the votes for each image tag; and
selecting the image tag based on the votes.

8. The method of claim 7, wherein each vote is weighted based on a magnitude of the corresponding distance prior to combining the votes.

9. The method of claim 1, wherein causing presentation on the user interface further comprises:
displaying at least a portion of the image;
receiving information indicating the image has been selected; and
displaying the image and information related to the image.

10. The method of claim 9, wherein the information related to the image comprises one or more images that share a similarity with the image, wherein the similarity is based on image tags shared between the image and the one or more images that are similar to the image.

11. The method of claim 10, wherein the similarity is further based on confidence values associated with the image tags shared between the image and the one or more images that are similar to the image.

12. The method of claim 9, further comprising:
receiving information indicating a position of a cursor with respect to the image, the cursor being controlled by a user;
determining whether the cursor is positioned over an object identified in the image; and
in response to determining the cursor is positioned over an object identified in the image, displaying a bounding box around the identified object.

13. The method of claim 12, further comprising:
receiving an indication that the bounding box has been selected; and updating the natural language query to include an image tag associated with the identified object corresponding to the bounding box.

14. The method of claim 1, wherein the natural language query comprises a plurality of query terms and an indication of whether the terms of the plurality of query terms are to be located within a third distance of each other, and in response to determining the terms are to be located within the third distance of each other, retrieving one or more images from the database of images tagged with each of the selected image tags wherein objects associated with the selected image tags are located within the third distance of each other.

15. The method of claim 1, further comprising:
automatically identifying, with a processor, at least one feature in each image of a plurality of untagged stored images; and
associating, with the processor, a respective image tag of the plurality of image tags with each image of the plurality of untagged stored images, each respective image tag corresponding to the at least one feature identified in the corresponding image of the plurality of untagged stored images.

16. The method of claim 1, further comprising:
receiving data indicating the image is to be shared; and
making the image available to one or more other parties.

17. The computer-implemented method of claim 1, wherein the second distance in the semantic space of words derives a vector from an operand that quantifies meaning based on the language context in which the words of the operand are used.

18. A system, comprising:
a computing-based device including a processor, a display connected to the processor, and memory storing instructions which, when executed by the processor, cause the processor to perform operations comprising:
receiving a natural language query comprising one or more terms for searching an image in a data structure, wherein the image is tagged with one or more image tags describing one or more objects depicted in the image;
computing a ontology distance in an image content ontology between the one or more terms and the one or more image tags, wherein each of the one or more image tags is a concept of the image content ontology and the ontology distance is computed by traversing between concepts in the image content ontology;
computing, using a first semantic distance method, a first semantic distance in a semantic space of words between the one or more terms and the one or more image tags, wherein the first semantic distance indicates a first semantic similarity between the one or more terms and the one or more image tags, and wherein the semantic space of words is generated by a machine-learning program;
computing, using a second semantic distance method, a second semantic distance in the semantic space of words between the one or more terms and the one or more image tags, wherein the second semantic distance indicates a second semantic similarity between the one or more terms and the one or more image tags, and wherein the first semantic distance method is different from the second semantic distance method;

comparing the ontology distance, the first semantic distance, and the second semantic distance to one or more threshold values;

when one or more distances of the ontology distance, the first semantic distance, and the second semantic distance do not exceed the one or more threshold values, selecting an image tag from the one or more image tags based on the one or more distances;

using the selected image tag to retrieve the image from the data structure; and causing presentation on a user interface of the image.

19. The system according to claim 18, the computing-based device being at least partially implemented using hardware logic selected from any one of more of: a field-programmable gate array, a program-specific integrated circuit, a program-specific standard product, a system-on-a-chip, or a complex programmable logic device.

20. A non-transitory machine-readable storage medium including instructions that, when executed by a machine, cause the machine to perform operations comprising:

receiving a natural language query comprising one or more terms for searching an image in a data structure, wherein the image is tagged with one or more image tags describing one or more objects depicted in the image;

computing a ontology distance in an image content ontology between the one or more terms and the one or more image tags, wherein each of the one or more image tags is a concept of the image content ontology and the ontology distance is computed by traversing between concepts in the image content ontology;

computing, using a first semantic distance method, a first semantic distance in a semantic space of words between the one or more terms and the one or more image tags, wherein the first semantic distance indicates a first semantic similarity between the one or more terms and the one or more image tags, and wherein the semantic space of words is generated by applying a trained neural network to a corpus of natural language documents;

computing, using a second semantic distance method, a second semantic distance in the semantic space of words between the one or more terms and the one or more image tags, wherein the second semantic distance indicates a second semantic similarity between the one or more terms and the one or more image tags, and wherein the first semantic distance method is different from the second semantic distance method;

comparing the ontology distance, the first semantic distance, and the second semantic distance to one or more threshold values;

when one or more distances of the ontology distance, the first semantic distance, and the second semantic distance do not exceed the one or more threshold values, selecting an image tag from the one or more image tags based on the one or more distances;

using the selected image tag to retrieve the image from the data structure; and causing presentation on a user interface of the image.

* * * * *